Dec. 25, 1928.　　　　　　　　　　　　　　1,696,643
F. W. NORTON
LAMP
Filed Sept. 29, 1927　　　2 Sheets-Sheet 1

Inventor
FRANK W. NORTON
By Paul, Paul & Moore
Attorneys

Dec. 25, 1928.   F. W. NORTON   1,696,643
LAMP
Filed Sept. 29, 1927   2 Sheets-Sheet 2

Inventor
FRANK W. NORTON
By Paul, Paul & Moore
Attorneys

Patented Dec. 25, 1928.

1,696,643

UNITED STATES PATENT OFFICE.

FRANK W. NORTON, OF CHICAGO, ILLINOIS.

LAMP.

Application filed September 29, 1927. Serial No. 222,798.

This invention relates to new and useful improvements in lamps and more particularly to such lamps adapted for ceiling mounting, comprising a hood or shell adapted to have a glass closure removably mounted therein.

An object of the invention is to provide a ceiling lamp comprising a hood adapted to have a glass closure mounted in threaded engagement therewith, and means being provided on the hood for engaging the glass closure to lock it thereto.

A further object of the invention is to provide a ceiling lamp comprising a hood having a glass closure mounted in threaded engagement therewith, the closure having an outwardly extending peripherally notched flange adapted to be seated against the hood, and a locking device movably mounted in the hood and adapted to engage one of the notches in said flange to lock the closure against rotation.

A further object is to provide a ceiling lamp particularly adapted for use in motor busses, street cars and other vehicles to light the interior thereof having means provided within the lamp to prevent the light rays from striking the windshield of the vehicle, thereby eliminating the glare usually present upon a windshield when using lamps of ordinary construction.

A further object is to provide a glass closure for a lamp hood having an outwardly extending annular flange provided with spaced notches therein adapted to receive a locking device for locking the closure to the hood, and a portion of the wall of the closure being adapted to prevent the light rays from being projected through such portion.

A further object is to provide a ceiling lamp comprising a hood having a reflecting surface therein and an outwardly extending annular flange, and a glass closure adapted to be mounted in threaded engagement with the hood, the closure being provided with a peripherally notched flange adapted to be engaged by a stud received in threaded engagement with the hood flange, whereby the closure may be locked against rotation and said stud having means thereon to prevent it from accidentally becoming detached from the hood.

The particular object of the invention therefore is to provide an improved ceiling lamp of simple and inexpensive construction, and which is well adapted for use in connection with automobile busses and other vehicles to light the interior thereof.

Other objects of the invention will appear from the following description and accompanying drawings and will be pointed out in the annexed claims.

In the drawings there has been disclosed a structure designed to carry out the various objects of the invention, but it is to be understood that the invention is not confined to the exact features shown, as various changes may be made within the scope of the claims which follow.

In the accompanying drawings forming part of this specification

Figure 1:
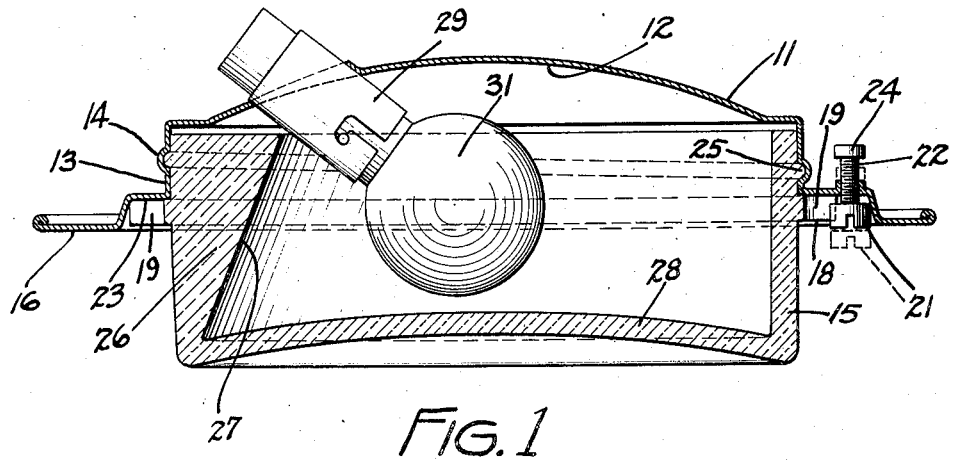
Figure 1 is a vertical sectional view through the improved lamp showing the means provided for locking the glass closure to the hood, and also the means provided on the glass closure for preventing the light rays from being projected through a certain portion of the wall thereof.

The novel lamp featured in this invention comprises a hood or shell 11 having a concaved reflecting surface 12 provided in the upper portion thereof, as shown in Figure 1. The wall 13 is provided with a suitable thread 14 adapted to receive a closure or lamp globe 15 removably mounted therein. An outwardly extending annular flange 16 is provided upon the hood 11 adapted to be fitted against the ceiling of the bus or other vehicle in which the lamp may be mounted. This flange is provided with suitable apertures 17 adapted to receive a fastening means for securing the lamp to the ceiling.

A feature of the invention resides in the novel means provided for securing the closure 15 to the hood 11. Such means preferably consists of providing upon the wall of the closure an annular flange 18 having a series of spaced notches 19 provided therein adapted to receive the head 21 of a stud 22, mounted in threaded engagement with the flange 16 of the hood. The flange 16 of the hood is provided with an annular recess 23 adapted to receive the notched flange 18 of the closure, and against the bottom of which this flange is seated when mounted in the hood, as shown in Figure 1.

Figure 3:
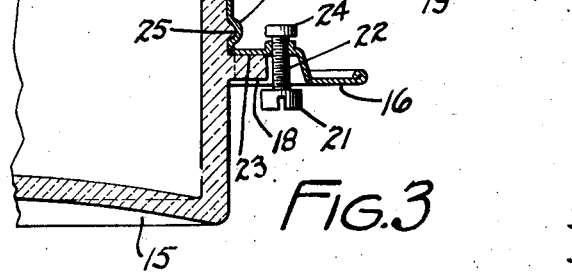
Figure 3 is a detailed sectional view showing the locking device in un-locking position.

The locking stud 22 preferably has a small head 24 provided upon the upper end thereof to prevent the stud from being removed from the flange 16, when the stud is moved into unlocking position as shown in dotted lines in Figure 1 and full lines in Figure 3. The closure 15 is provided with suitable threads 25 adapted to be received in the threads 14 provided in the hood wall. The closure 15 is, therefore, secured to the hood 11 by means of the threads 14 and 25.

Figure 2:
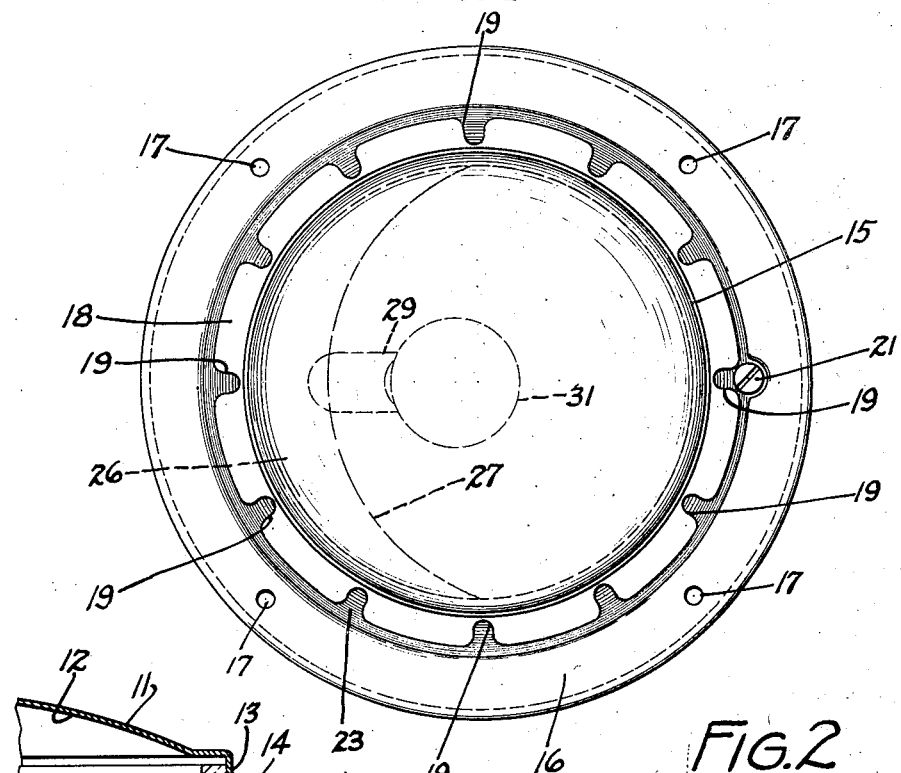
Figure 2 is a bottom view of the lamp.

When the closure is mounted in the hood 11, the closure will be rotated until the notched flange 18 engages the bottom of the recess 23, after which it will be adjusted until one of the notches 19 is aligned with the lock stud 22 as shown in Figure 2. The stud 22 may then be screwed into the flange 16 until the head 21 engages the bottom of the recess 23, after which it will be noted, by reference to Figure 2, that the head 21 will be seated in one of the notches 19, thereby preventing the closure from being rotated in the hood while the head is thus engaged with one of the notches. To remove the closure 15 from the hood, the stud 22 will be unscrewed to the position shown in Figure 3, or until the smaller head 24 engages the back of the flange 16, after which the closure may readily be unscrewed for demounting. The threads 14 and 25 are preferably relatively coarse so that the closure need not be rotated more than a revolution, or so, to secure it to the hood and likewise to remove it therefrom.

Another feature of the invention resides in the means provided for preventing the lamp from projecting a glare in one direction or towards the driver of the vehicle, thereby preventing any unnecessary reflections from being projected onto the windshield before the driver with its resultant disadvantages. Such means preferably consists of shaping a portion of the wall 26 of the closure to prevent the light rays from being directed through such portion of the wall. As shown in Figure 1, the wall portion 26 is preferably thickened at its upper edge to provide an inclined inner surface 27 extending substantially one-half the circumference of the closure, as shown in Figure 2. This inclined surface 27 may, if desired, be coated with a suitable light-absorbing material to further prevent the light rays from being directed therethrough. The lower wall 28 of the closure 15 is preferably concaved as shown in Figure 1, to prevent the rays of the lower portion of the lamp being reflected into the windshield, a common objection with lamps of ordinary construction having a convexed lower wall or bottom. A socket 29 is suitably mounted in the upper concaved wall of the hood adapted to receive a light bulb 31 as shown.

From the foregoing it will readily be seen that this novel lamp is well adapted for use for lighting the interior of passenger transportation busses and other vehicles. By means of the reflecting surface 12 in the upper portion of the hood, the light rays will be directed downwardly with their full intensity. The inclined surface 27 in the wall portion 26 of the closure 15 will prevent the light rays from being projected therethrough onto the windshield of the vehicle, thereby eliminating the usual objection common to lamps of ordinary construction, wherein the light rays are projected through the entire circumference of the vertical wall 15 of the closure, and therefore onto the windshield.

Figure 5:
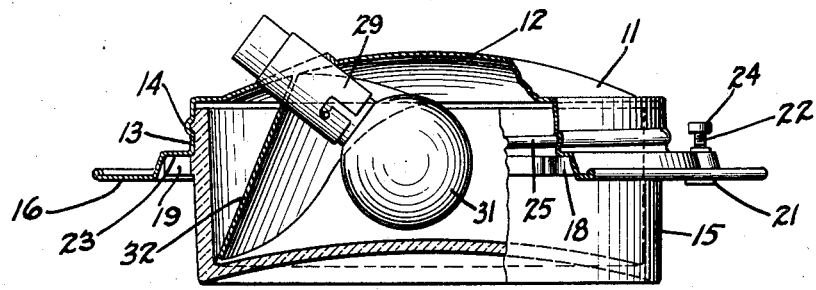
Figure 5 is a detailed sectional view through a modified form of lamp.
Figure 6:
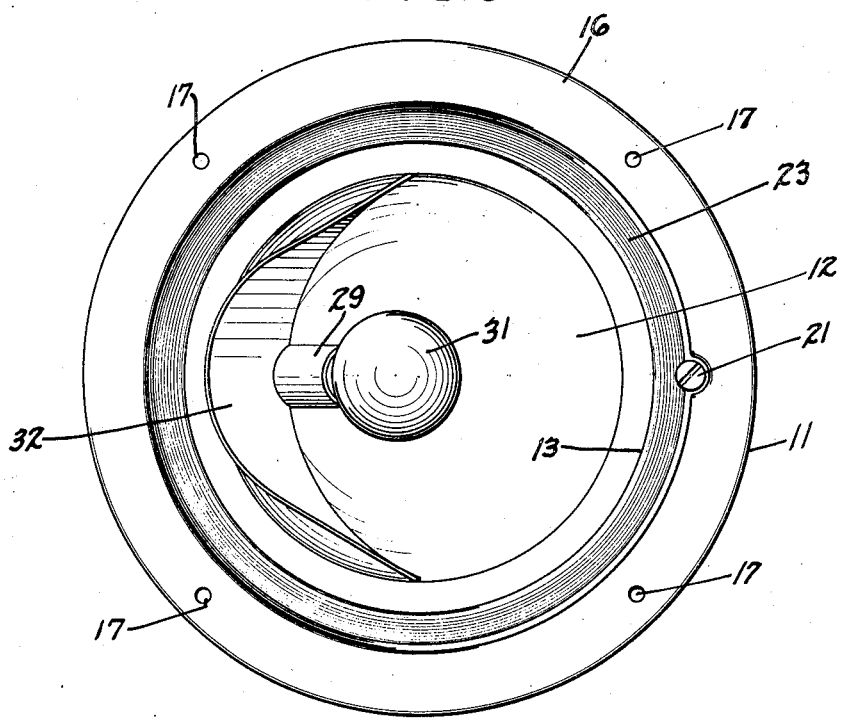
Figure 6 is a bottom view of Figure 5, with the glass closure removed.
Figure 4:
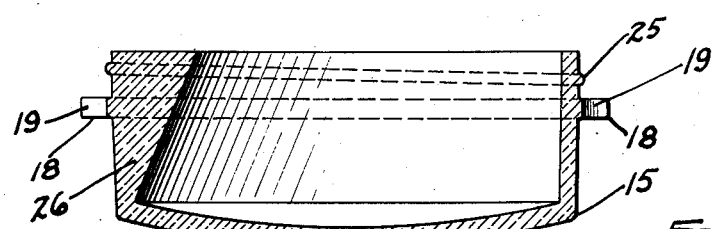
Figure 4 is a view of the glass closure removed from the lamp and showing a modified bottom thereon.

Figures 4, 5 and 6 illustrate a modified construction wherein the vertical wall of the closure 15 is of uniform thickness, and to prevent the light rays from being projected through a portion thereof onto the windshield, an inclined metal wall 32 is provided within the closure 15 having its upper edge secured to the upper concaved wall of the hood 11 as shown. If desired, the inner surface of this inclined wall 32 may be plated or polished to provide a reflecting surface similar to the reflecting surface 12 in the upper portion of the hood. Figure 4 illustrates a closure or lamp shade having a vertical wall similar to that of the closure shown in Figure 1, but having its lower wall or bottom 33 convexed to provide additional room within the closure and hood for the light bulb 31.

By the employment of the locking stud 22 and the novel manner in which it is mounted in the flange 16 of the hood, the closure 15 may be locked in adjusted position within the hood to prevent it from accidentally becoming loosened therein. The head 24 prevents the stud 22 from becoming detached from the flange 16 when being unscrewed to its unlocking position, and when the closure has been mounted in the hood as shown in Figure 1, the locking stud 22 may readily be screwed into locking position by means of the slotted head 21, thereby positively preventing the closure from accidentally becoming disengaged from the hood 11.

I claim as my invention:

1. A device of the class described, comprising in combination, a hood having an interiorly threaded wall, an exteriorly threaded member removably mounted in said hood, an annular outwardly extending flange on said member, and means movably mounted in said hood and adapted to engage said flange to lock said member to said hood.

2. A device of the class described, comprising in combination, a hood having an interiorly threaded wall, an exteriorly threaded member removably mounted in said hood, an annular outwardly extending flange on said member having a plurality of spaced peripheral notches and a locking device mounted in said hood and adapted to be moved into engagement with one of said notches to lock said member to said hood.

3. A device of the class described, comprising in combination, a hood having an outwardly extending annular flange, a member mounted in said hood and having a threaded connection therewith, a peripherally notched flange on said member, and a locking device received in threaded engagement with the flange of said hood and adapted to be moved into engagement with said notched flange to lock said member to said hood.

4. A ceiling lamp comprising in combination a hood having a reflecting surface, means for securing a light bulb therein, a glass member mounted in said hood to provide a closure therefor, means for securing said closure thereto, an annular outwardly extending flange on said member adapted to be seated against said hood, a plurality of spaced notches in the periphery of said flange, and a stud inseparably mounted in threaded engagement with said hood and adapted to be moved into engagement with one of said notches to lock said closure to said hood.

5. A ceiling lamp comprising in combination a flanged hood having a concave reflecting surface, means for securing a light bulb within said hood, a glass closure adapted to be mounted in said hood and having a threaded connection therewith, said closure having an outwardly extending flange adapted to be seated against the flange of said hood and having a plurality of notches in its periphery and a stud having a head thereon mounted in threaded engagement with said hood flange whereby the head of said stud may be moved into locking engagement with one of said notches to lock the closure in adjusted position.

6. A ceiling lamp comprising in combination a hood having a glass closure mounted therein, said closure having an annular notched flange adapted to be seated against said receptacle, a stud mounted in threaded engagement with said hood and having a head adapted to be moved into locking engagement with one of the notches in said closure flange, and means for preventing said stud from becoming detached from said hood.

7. A ceiling lamp comprising in combination a hood having a reflecting surface and means for securing a light bulb therein, a glass closure mounted in threaded engagement with said hood, an outwardly extending notched flange on said closure adapted to be moved into engagement with said hood, a locking device received in threaded engagement with said hood and adapted to be moved into engagement with one of the notches in said closure flange to lock said closure in adjusted position, and a portion of said closure wall being thicker than the remaining portions thereof and inclined to prevent direct projection of the light rays therethrough.

8. A glass closure for a lamp, comprising an exteriorly threaded cylindrical wall adapted to be received in threaded engagement within a supporting hood, an outwardly extending annular flange provided upon said cylindrical portion intermediate its ends and having a plurality of spaced notches in the periphery of said flange adapted to be engaged by a locking device, said closure having a concaved bottom, and a portion of said cylindrical wall being thicker than the remaining portions to subdue the light rays projected therethrough.

9. A lamp assembly of the character described, comprising a hood, means for securing a light bulb therein, a translucent dome forming a closure for the hood and having screw-threaded engagement therewith whereby the dome may be screwed on and off the hood, said dome having a plurality of spaced peripheral notches, and a locking device associated with the hood and adapted, when engaged with any of said notches, to hold the dome from turning with respect to the hood.

10. A lamp assembly of the character described, comprising a hood, means for securing a lamp bulb in the hood, a translucent dome forming a closure for the hod and having screw-threaded engagement therewith whereby the dome may be screwed onto and off the hood, said dome having a plurality of spaced peripheral notches, and a locking device movably mounted on the hood and adapted, when free of said notches, to permit turning of the dome with respect to the hood, but when engaged with any of said notches to hold the dome from turning in the hood.

11. A lamp assembly of the character described, comprising a hood having an annular shoulder about the same, means for securing a light bulb in the hood, a translucent dome forming a closure for the hood and having an outwardly extending flange adapted to seat against said shoulder, means providing a screw-threaded connection between the dome and the hood whereby the dome may be screwed into the hood with its flange in tight contact with said shoulder, and a locking device associated with the hood and adapted, when engaged with said flange, to hold the dome from turning with respect to the hood.

In witness whereof, I have hereunto set my hand this 17th day of September, 1927.

FRANK W. NORTON.